United States Patent
Hirth et al.

(10) Patent No.: US 9,371,760 B2
(45) Date of Patent: Jun. 21, 2016

(54) METHOD FOR OPERATING AN EXHAUST-GAS TREATMENT DEVICE HAVING A HEATER AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Peter Hirth, Roesrath (DE); Peter Bauer, Siegburg (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/474,464

(22) Filed: Sep. 2, 2014

(65) Prior Publication Data

US 2014/0366509 A1   Dec. 18, 2014

Related U.S. Application Data

(63) Continuation of application No. PCT/EP2013/054065, filed on Feb. 28, 2013.

(30) Foreign Application Priority Data

Mar. 2, 2012 (DE) .......................... 10 2012 004 267
Aug. 7, 2012 (DE) .......................... 10 2012 107 207

(51) Int. Cl.
*F01N 3/00* (2006.01)
*F01N 3/20* (2006.01)
*F01N 9/00* (2006.01)

(52) U.S. Cl.
CPC .............. *F01N 3/2006* (2013.01); *F01N 3/208* (2013.01); *F01N 3/2013* (2013.01);
(Continued)

(58) Field of Classification Search
USPC .................... 60/274, 277, 286, 300, 301, 303
See application file for complete search history.

(56) References Cited

U.S. PATENT DOCUMENTS 5,411,711 A    5/1995 Swars
5,711,149 A *  1/1998 Araki ................... F01N 3/2033
                                                        422/183

(Continued)

FOREIGN PATENT DOCUMENTS

DE    102010025643 A1    1/2011
EP        0541585 B1     1/1994
(Continued)

*Primary Examiner* — Binh Q Tran
(74) *Attorney, Agent, or Firm* — Laurence A. Greenberg; Werner H. Stemer; Ralph E. Locher

(57) ABSTRACT

A method for operating an exhaust gas treatment device including an electric heater for heating an exhaust gas flow in the exhaust gas treatment device and/or a surface in the exhaust gas treatment device and a feed point for feeding an additive into the exhaust gas treatment device to impinge upon the electric heater, includes supplying additives to the feed point, determining an operational state of the exhaust gas treatment device, in which deposits can impinge upon the electric heater, using at least one state variable, determining a cycle frequency in dependence on the operating state when the operating state lies in a predetermined operating state range, and cyclically activating and deactivating the electric heater using the determined cycle frequency when the determined operating state lies in the predetermined operating state range. A motor vehicle having the exhaust-gas treatment device is also provided.

15 Claims, 4 Drawing Sheets

(52) U.S. Cl.
CPC ............... *F01N 3/2066* (2013.01); *F01N 9/00* (2013.01); *F01N 2610/02* (2013.01); *F01N 2610/102* (2013.01); *Y02T 10/24* (2013.01); *Y02T 10/26* (2013.01); *Y02T 10/47* (2013.01)

(56) References Cited

U.S. PATENT DOCUMENTS

| | | | | |
|---|---|---|---|---|
| 5,839,273 | A * | 11/1998 | Maus | F01N 3/0253 60/274 |
| 8,061,123 | B2 * | 11/2011 | Driscoll | F01N 3/208 60/274 |
| 8,479,496 | B2 | 7/2013 | Gonze et al. | |
| 8,661,790 | B2 * | 3/2014 | Gonze | F01N 9/00 60/286 |
| 8,973,349 | B2 * | 3/2015 | Gonze | F01N 3/0814 60/286 |
| 9,021,793 | B2 * | 5/2015 | Kim | F01N 3/0835 60/274 |
| 2010/0290957 | A1 | 11/2010 | Yoshida et al. | |
| 2013/0255235 | A1 | 10/2013 | Hodgson et al. | |

FOREIGN PATENT DOCUMENTS

| | | |
|---|---|---|
| EP | 2256312 A1 | 12/2010 |
| WO | 2011120838 A1 | 10/2011 |

* cited by examiner

METHOD FOR OPERATING AN EXHAUST-GAS TREATMENT DEVICE HAVING A HEATER AND MOTOR VEHICLE HAVING THE DEVICE

CROSS-REFERENCE TO RELATED APPLICATION

This is a continuation, under 35 U.S.C. §120, of copending International Application No. PCT/EP2013/054065, filed Feb. 28, 2013, which designated the United States; this application also claims the priority, under 35 U.S.C. §119, of German Patent Application DE 10 2012 107 207.8, filed Aug. 7, 2012, and German Patent Application DE 10 2012 004 267.1, filed Mar. 2, 2012; the prior applications are herewith incorporated by reference in their entirety.

BACKGROUND OF THE INVENTION

Field of the Invention

The invention relates to a method for operating an exhaust-gas treatment device having a heater for heating an exhaust-gas stream in the exhaust-gas treatment device and a feed point in the exhaust-gas treatment device permitting an additive to be metered into the exhaust-gas treatment device at the feed point. The invention also relates to a motor vehicle having the exhaust-gas treatment device.

Exhaust-gas treatment devices into which an additive for exhaust-gas purification is metered are widely used inter alia in the automotive field. An example of such exhaust-gas treatment devices is an exhaust-gas treatment device in which the process of selective catalytic reduction [SCR process] is carried out. In that process, nitrogen oxide compounds in the exhaust gas are purified with the aid of a reducing agent (which is fed, as an additive, to the exhaust gas). Further exhaust-gas treatment devices to which an additive is fed are exhaust-gas treatment devices into which hydrocarbons are fed (in particular fuel is fed) in order to be burned in a catalytic converter and increase the temperature of the exhaust gases. It is thus possible to ensure that certain thermally activated conversion reactions occur in the exhaust-gas treatment device (and, in particular, in filters).

It has been found that a heater for heating an exhaust-gas stream may become contaminated or even blocked with exhaust gas and/or exhaust-gas constituents. Firstly, that increases the flow resistance to the exhaust gases posed by the heater in the exhaust-gas treatment device. Secondly, the heating performance of the heating device is adversely affected because adequate heating of the exhaust gas is not possible due to the deposits on the heater.

SUMMARY OF THE INVENTION

It is accordingly an object of the invention to provide a method for operating an exhaust-gas treatment device having a heater and a motor vehicle having the exhaust-gas treatment device, which overcome the hereinafore-mentioned disadvantages and solve, or at least lessen, the highlighted technical problems of the heretofore-known devices and vehicles of this general type. It is sought, in particular, to propose an especially advantageous method for operating an exhaust-gas treatment device with an electric heater.

With the foregoing and other objects in view there is provided, in accordance with the invention, a method for operating an exhaust-gas treatment device, which comprises:

providing an electric heater for heating at least one exhaust-gas stream or a surface in the exhaust-gas treatment device;

providing a feed point for feeding an additive into the exhaust-gas treatment device in such a way that the additive impinges on the electric heater;

a) feeding the additive at the feed point;

b) identifying, on the basis of at least one state variable, an operating state of the exhaust-gas treatment device in which deposits can form on the electric heater;

c) setting a cycle frequency as a function of the operating state if the operating state identified in step b) lies in a predefined operating state range; and d) cyclically activating and deactivating the electric heater at the set cycle frequency if the operating state identified in step b) lies in the predefined operating state range.

The exhaust-gas treatment device normally serves for the purification of the exhaust gases of an internal combustion engine. The exhaust-gas treatment device is connected to the internal combustion engine for this purpose.

The electric heater is preferably operated with an electrical current that is provided, in particular, from the on-board electrical system of a motor vehicle. The heater preferably has an electric heating body around which the exhaust-gas stream can flow in the exhaust-gas treatment device and which can thus release the heat that is produced during heating to the exhaust-gas stream. In one embodiment of the method, the heater serves for heating the exhaust-gas stream in the exhaust-gas treatment device. In a further embodiment, the heater serves for heating a surface in the exhaust-gas treatment device. The surface is preferably in contact with the exhaust-gas stream and may, for example, be a surface of a honeycomb body. The surface may be a surface of the heater itself. In one preferred embodiment of the method, the heater serves for heating both the exhaust-gas stream and also a surface. The feed point may, for example, include a valve and/or an injector through the use of which the amount of additive metered to the exhaust-gas treatment device can be regulated.

In the described method, a feed of the additive firstly takes place at the feed point. The feed of the additive preferably takes place independently of the heating of the exhaust-gas stream. Additive is preferably fed in an amount required by an exhaust-gas purification component (for example an SCR catalytic converter, an oxidation catalytic converter or an adsorber) provided in the exhaust-gas treatment device.

In step b), in particular, a value calculated from various operating parameters of the exhaust-gas treatment device is identified as an operating state, or a parameter set made up of various operating parameters is identified as an operating state. This may be performed, for example, on the basis of operating parameters that are measured in the exhaust-gas treatment device, for example on the basis of temperatures. The temperature of the exhaust gas itself or of a temperature of an exhaust line that conducts the exhaust gas may, for example, be used. Such a temperature is representative of the temperature of the exhaust gas. It is also possible for an operating parameter of the exhaust-gas treatment device to be calculated for the operating state from various operating variables of an internal combustion engine that is connected to the exhaust-gas treatment device. For example, a mass flow through the exhaust-gas treatment device can be calculated from an air and fuel mass burned by the internal combustion engine, and this can be used as an operating state for step b).

In step c), the operating state identified in step b) is compared with a predefined operating state range. The operating state range has certain operating state limits between which the predefined operating state range lies. If the operating state identified in step b) lies within the operating state limits, the operating state identified in step b) lies in the predefined operating state range. The predefined operating state range is preferably bounded by limit values on both sides, and is not open on one side.

In a simple embodiment of the method, the operating state is a temperature measured in the exhaust-gas treatment device, and the operating state range is a predefined temperature range. For example, the operating state range may begin at 100° C. and end at 180° C. The operating state then lies in the predefined operating state range if the measured temperature lies in the specified temperature range.

The cycle frequency is preferably calculated, in accordance with a predefined calculation formula, from the operating parameters that characterize the operating state range. In an embodiment of the method according to the invention, in which the operating state is merely a temperature measured in the exhaust-gas treatment device, the cycle frequency may be defined, for example, as a function of the temperature.

In step d), the comparison of the (present/impending) operating state identified in step b) with the predefined operating state range is preferably performed as in step c). In the case of a heater operated with an electrical current, the activation and deactivation of the heater is realized by activation and deactivation of the current that flows through the heater. The cycle frequency defined in step c) is preferably characterized by a repeat rate (specified, for example, in hertz). The repeat rate may, for example, lie between 1 kilohertz (1000 repetitions per second) and 0.001 hertz (one repetition every 1000 seconds). A repeat rate between 4 hertz (every 0.25 seconds) and 0.5 hertz (every 2 seconds) is particularly preferable. A repeat rate between 0.05 hertz (every 20 seconds) and 0.005 hertz (every 200 seconds) is also preferable. The repeat rates specified herein apply, in particular, when the internal combustion engine is being operated in the low-load range. The cycle frequency is preferably set in step c) on the basis of a storage model of an ammonia storage device of the exhaust-gas treatment device. The ammonia storage device is preferably in the form of a storage coating that may, for example, be formed in an SCR catalytic converter. The storage model may be stored in a data processing device and permits an estimation of the amount of ammonia stored in the ammonia storage device. With the storage model, it is for example possible for the temperature of the ammonia storage device and the amounts of liquid additive being fed to be used as parameters in order to determine the amount of ammonia stored. It is additionally possible for further parameters to be taken into consideration for determining the amount of ammonia stored.

The predefined operating state range is preferably an operating state range in which increased amounts of deposits form on the heater. The operating state range is, for example, an operating state range in which a desired conversion reaction of the additive takes place or begins to take place but does not take place completely, and residues can thus form on the heater. It has been found to be advantageous to then operate the heater in cyclic fashion in such a way that the deposits or residues of additive on the heater are converted and/or burned. This can be realized with particularly little energy outlay by cyclic operation of the heater.

It is particularly advantageous if the surface on which deposits form is heated directly by the heater, because then, deposits on the surface can be converted and/or burned in a particularly effective manner.

In accordance with another particularly advantageous mode of the method of the invention, the heater includes an electrically heatable honeycomb body. A honeycomb body of this type has, for example, a multiplicity of channels or ducts through which the exhaust gas can flow. A heating honeycomb body of this type is, in particular, mechanically stable, and is above all much more stable than a heater that is formed from heating wires stretched across the exhaust-gas treatment device. Furthermore, a honeycomb body of this type has a particularly large surface area through which heat can be released from the honeycomb body to the exhaust gas. It can be a problem that a honeycomb body of this type has very small channels or ducts that can become blocked relatively easily. The channels or ducts can then be cleaned (or freed from deposits) by using the described method. The heatable honeycomb body may be at least partially coated with an active coating. An active coating can convert and/or store constituents of the exhaust gas or of the additive.

In accordance with a further particularly advantageous mode of the method of the invention, the additive is a reducing agent, and at least one SCR catalytic converter is disposed in the exhaust-gas treatment device downstream of the feed point as viewed in an exhaust-gas flow direction.

The exhaust-gas treatment device that can be operated in accordance with the method of the invention includes not only the heater but preferably, for example, an SCR catalytic converter, a storage catalytic converter, an oxidation catalytic converter and/or an adsorber.

The process of selective catalytic reduction is performed in the SCR catalytic converter. Reducing agent, preferably liquid urea-water solution, is then fed as the additive. A typical additive used as a reducing agent for selective catalytic reduction is a 32.5% urea-water solution that is available under the trademark AdBlue®. Such a solution forms particularly firmly adherent deposits if the temperature is only sufficient to partially convert the solution into ammonia and, in particular, is not sufficient to completely evaporate the solution. Some of the urea from the solution then remains as deposits on the surfaces impinged upon by the unevaporated liquid reducing agent in the exhaust-gas treatment device. Ammonia for the selective catalytic reduction can be temporarily stored in a storage catalytic converter. A storage catalytic converter and an SCR catalytic converter may be realized jointly in one honeycomb body, wherein the honeycomb body has a coating which has both ammonia-storing components and also components for promoting the selective catalytic reduction.

In a further embodiment, the exhaust-gas treatment device includes an oxidation catalytic converter and/or an adsorber. When using an oxidation catalytic converter and/or an adsorber in the exhaust-gas treatment device, it is preferable for hydrocarbons, in particular fuel (or the fuel used for the connected internal combustion engine), to be fed as the additive. The temperature in the exhaust-gas treatment device is increased through the use of the hydrocarbons. Therefore, the hydrocarbons are burned on a catalytic converter (preferably a platinum catalytic converter) provided for this purpose. As a result of the elevated temperature, certain conversion reactions in the oxidation catalytic converter can be activated, and/or it is made possible for the adsorber to be freed from the stored exhaust-gas constituents. An adsorber has the task, in particular during a cold start of an internal combustion engine, of at least temporarily storing the pollutants that are generated by the internal combustion engine. This is advantageous, in particular, when the temperature of the exhaust-gas treatment device is still low during the cold start and certain conversion reactions therefore cannot yet take place in the exhaust-gas treatment device. At a later time, when the temperature in the exhaust-gas treatment device has risen above certain threshold temperatures, the pollutants stored in the adsorber can be released/converted.

The coating for an adsorber, an oxidation catalytic converter, an SCR catalytic converter and/or a storage catalytic converter may also be at least partially provided on the electrically heatable honeycomb body.

In accordance with an added advantageous mode of the method of the invention, in step b), at least one of the following state variables is used for identifying the operating state:
   at least one temperature;
   a mass flow of the additive through the feed point into the exhaust-gas treatment device; or
   a mass flow of the exhaust-gas stream in the exhaust-gas treatment device.

The temperature may, for example, be an exhaust-gas temperature measured in the exhaust-gas treatment device and/or a temperature of a wall of the exhaust-gas treatment device. The temperature is particularly relevant to the formation of deposits because the conversion reaction by which the additive is converted is significantly dependent on the temperature, and the formation of deposits is thus also dependent on the temperature. The mass flow of the additive substantially determines the rate with which deposits form on the heater, and the amount of the deposits. It may, for example, be advantageous to increase the cycle frequency if the mass flow of additive is increased. The mass flow has an erosive effect on the deposits. It is therefore also advantageous for the mass flow of the exhaust-gas stream in the exhaust-gas treatment device to be taken into consideration for the method. It is particularly preferable for all three mentioned parameters to be used for the method.

In accordance with an additional advantageous mode of the method of the invention, in step c), not only the cycle frequency but also a heating period, over which the heater is operated during each cycle length of the cycle frequency, is set. The heating period is preferably characterized by a heating duration. The heating period may, for example, be between 1 millisecond and 20 seconds in length. If the cycle frequency of the operation of the heater lies in the preferred range between 4 hertz and 0.5 hertz, or between 0.05 hertz and 0.005 hertz (and the cycle length is thus between 0.25 seconds and 2 seconds, or between 20 seconds and 200 seconds, respectively), the heating period is however preferably between 1 second and 20 seconds in length.

Such a heating period is sufficient for eliminating (or burning off) the deposits on the heater in an effective manner. At the same time, the input of heat energy into the exhaust-gas treatment device remains relatively low. In particular, no significant increase in exhaust-gas temperature occurs. Through the use of an adaptation of the heating period, it can be achieved that precisely the amount of heat energy actually required for burning off the existing deposits is introduced into the exhaust-gas treatment device. The cycle length indicates the time interval from the start of one heating period to the start of the next heating period, and is determined, for example, as the reciprocal of the cycle frequency.

In accordance with yet another advantageous mode of the method of the invention, the cycle frequency is selected in such a way that the heater is activated for less than 20 percent of that operating time of the exhaust-gas treatment device during which the operating state of the exhaust-gas treatment device lies in the predefined operating state range. The heater is even preferably activated for less than 10%, and particularly preferably less than 5%. It is even particularly preferable for the heater to be activated for less than 2% of the operating time of the exhaust-gas treatment device. In this case, the higher limits may be used, in particular, for operation of the motor vehicle in urban traffic. Through the use of the method according to the invention, it is preferably achieved that, averaged over the operating time, a heating power of less than 500 watts, preferably less than 100 watts and particularly preferably less than 50 watts is introduced into the exhaust-gas treatment device. It is thus possible to realize particularly energy-saving operation of the method, and deposits on the heater are nevertheless removed in an effective manner.

In accordance with yet a further advantageous mode of the method of the invention, a temperature of the exhaust-gas stream in the exhaust-gas treatment device is raised by less than 50° C., preferably even by less than 25° C., as a result of the cyclic operation of the heater. The method is furthermore advantageous if a temperature of the exhaust-gas stream in the exhaust-gas treatment device is raised by less than 15° C., preferably less than 5° C. and particularly preferably less than 2° C., as a result of the cyclic operation of the heater. Through the use of such operation of the heater over only a small fraction of the operating time and with a small increase in temperature of the exhaust-gas stream, it is possible to realize particularly energy-saving operation of the method, with which deposits on the heater are nevertheless removed in an effective manner.

The operating method described above is advantageous, in particular, if the heater is in a state, and/or of a construction, in which the heat transfer to the exhaust gas is reduced. In this case, the heater may, for example, have a small heated surface area, in such a way that a small amount of heat is released from the heater to the exhaust-gas stream. It is also possible for a heated surface of the heater or a heated region to be at least partially shielded from the exhaust-gas stream, in such a way that only a fraction of the exhaust-gas stream comes into heat-conducting contact with the heater. The heater may, for example, be disposed in the flow shadow of another component in the exhaust-gas treatment device. It is also possible for the heater to be composed of a material, the surface of which has a low coefficient of heat transfer to the exhaust gas.

In this connection in particular, it is preferable for a feed device for the liquid additive to be disposed in such a way that the liquid additive impinges as completely as possible on the heater. It can thus be achieved that, locally and/or in the direct vicinity of the heater or at the heater, an intense temperature increase is achieved by using the heater and conversion of the liquid additive takes place. It is thus possible for deposits of the liquid additive on the heater to be evaporated, burned off and/or even prevented in a particularly effective manner. At the same time, only a small amount of heat energy is required because the exhaust-gas stream is heated only to a small extent.

In accordance with yet an added advantageous mode of the method of the invention, the feed point is disposed upstream of the heater as viewed in an exhaust-gas flow direction through the exhaust-gas treatment device, and the additive is metered-in in the exhaust-gas flow direction. The additive then impinges on the heater, and the additive preferably impinges on the heater while still in liquid form (still in an unevaporated state). The liquid additive preferably impinges on the heater while in droplet form. If the liquid additive is reducing agent (and, in particular, urea-water solution), it can be at least partially chemically converted on the heater. The conversion product is preferably ammonia. If the chemical conversion does not take place completely (for example due to low exhaust-gas temperatures), deposits can be formed on the heater. The deposits are composed, for example, of crystalline urea. The deposits can, for example, be eroded and/or broken down by using the described method.

Reducing agent converted into ammonia is preferably temporarily stored in a storage device in order to be utilized at a later time for the reduction of pollutants in the exhaust gas.

The storage device may, for example, be provided, in an SCR catalytic converter, as a coating. The coating temporarily binds the ammonia. When the storage device is full (or fully loaded), ammonia additionally present in the exhaust-gas treatment device (or additionally fed reducing agent) can also form deposits. These deposits, too, can for example be eroded and/or broken down by using the described method.

In accordance with yet an additional advantageous mode of the method of the invention, the feed point is disposed downstream of the heater as viewed in an exhaust-gas flow direction through the exhaust-gas treatment device, and the additive is metered counter to the exhaust-gas flow direction. The liquid additive is preferably fed at a pressure that is sufficient to accelerate the liquid additive at the feed point so that the liquid additive passes through the exhaust-gas treatment device to the heater counter to the exhaust-gas flow. In this structural variant, too, deposits can form that can be eroded and/or broken down by using the described method.

In accordance with again another advantageous mode of the method of the invention, the feed of additive in step a) takes place at least at one predefined injection time, wherein the at least one predefined injection time is adapted at least to the cycle frequency of the activation of the heater. The at least one predefined injection time is very particularly preferably also adapted to the cycle length of the activation of the heater.

It is preferable for not only an injection time but also at least one injection duration to be adapted to the cycle frequency and if appropriate also the cycle length of the activation of the heater. It is, for example, possible for the injection time (and the injection duration) to be set in such a way that the feed of additive takes place directly before the activation of the heater. If appropriate, the injection duration may also overlap with the activation of the heater. The feed of liquid additive may then be performed with a cycle frequency that corresponds to the cycle frequency of the activation of the heater, wherein the individual operating cycles of the feed device are offset in relation to the operating cycles of the heater. In this case, on one hand, it may be provided that, for each activation of the heater, a feed of additive takes place at a predefined injection time. On the other hand, it may also be provided that, for a multiplicity of activations of the heater, a common (continuous) feed of additive takes place at a predefined injection time. A multiplicity of activations of a heater refers in this case to a multiplicity of operating cycles of the heater with a cycle frequency. In a further embodiment, the injection time may be set in such a way that a set series of activations of the heater takes place after a feed of liquid additive.

The injection time and/or the injection duration may be adapted not only to the cycle frequency of the activation of the heater. It is alternatively or additionally also possible for the injection time and/or the injection duration to be adapted to the cycle length of the activation of the heater or to a heating period of the operation of the heater during a single operating cycle. In this case, the heating period refers, in particular, to a duration of the operation of the heater during a single cycle of the cycle frequency.

The injection time corresponds, for example, to the opening time of an injector at the feed point, through the use of which injector the feed of liquid additive to the exhaust-gas treatment device can be controlled. The injection duration then corresponds, in particular, to the time period which follows the injection time and during which the injector is open. The injection duration is followed by a closing time at which the injector is closed again.

With the objects of the invention in view, there is concomitantly provided a motor vehicle, comprising an internal combustion engine, an exhaust-gas treatment device for the purification of the exhaust gases of the internal combustion engine, and a control unit which is constructed and set up or configured to operate the exhaust-gas treatment device in accordance with the described method.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being highlighted.

Although the invention is illustrated and described herein as embodied in a method for operating an exhaust-gas treatment device having a heater and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
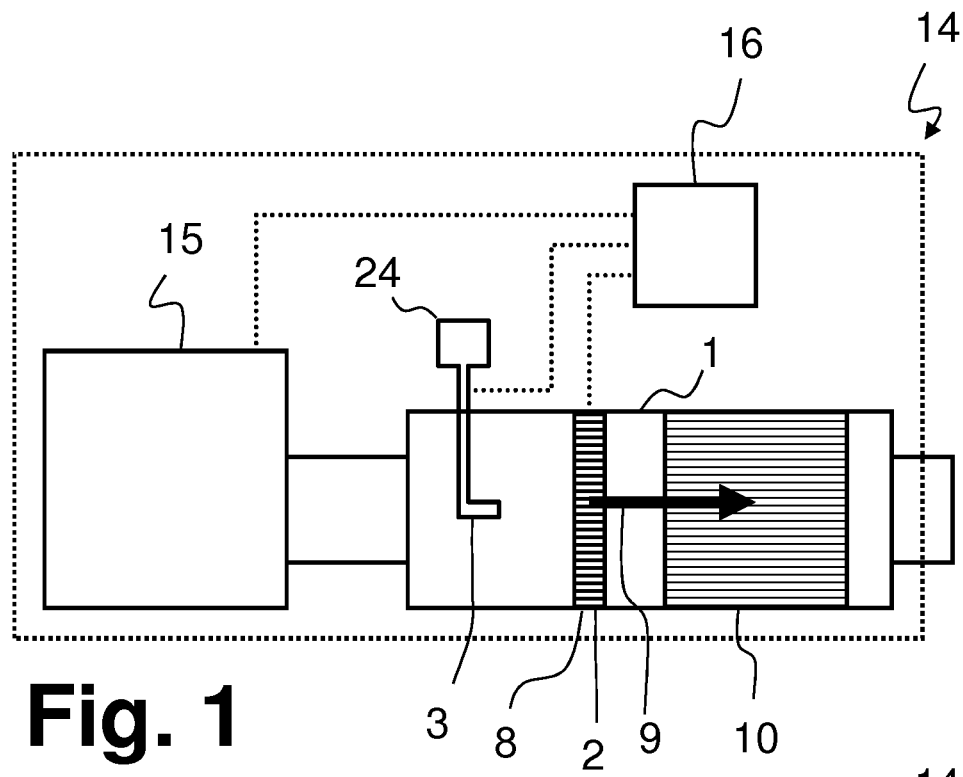
FIG. 1 is a block diagram of a first embodiment of an exhaust-gas treatment device.

Referring now to the figures of the drawings in detail and first, particularly, to FIGS. 1 to 4 thereof, there are seen different embodiments of an exhaust-gas treatment device 1 which can be operated in accordance with the described method and the common features of which will firstly be explained jointly herein. The figures each show the exhaust-gas treatment device 1 in a motor vehicle 14 that has an internal combustion engine 15. The exhaust-gas treatment device 1 is set up or configured and provided for purifying the exhaust gases produced by the internal combustion engine 15. The exhaust gases flow through the exhaust-gas treatment device 1 in an exhaust-gas flow direction 9. In each case, a feed point 3 through which an additive can be fed is provided in the exhaust-gas treatment device 1. The feed point 3 is supplied with additive by an additive supply 24 and may include a nozzle, a valve, an injector or the like. In each case, a heater 2 in the form of a heatable catalyst carrier or substrate 8 is provided in the exhaust-gas treatment device 1 for the purpose of heating the exhaust gases in the exhaust-gas treatment device 1. The heater 2 is controlled by a control unit or controller 16 that can activate (by supply of electrical current) and deactivate the heater 2.

Figure 2:
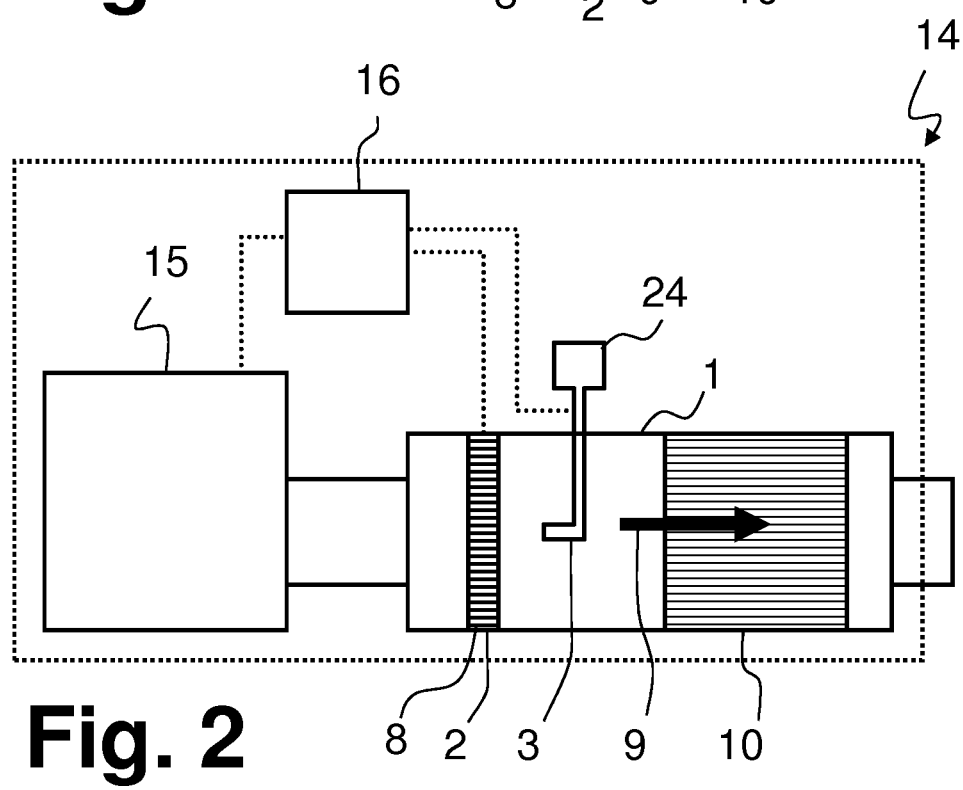
FIG. 2 is a block diagram of a second embodiment of an exhaust-gas treatment device.

In each of the embodiments according to FIGS. 1 and 2, an SCR catalytic converter 10 is provided in the exhaust-gas treatment device 1 downstream of the feed point 3 (and, in particular, also downstream of the heater 2) as viewed in the exhaust-gas flow direction 9. The process of selective catalytic reduction can be performed in the SCR catalytic converter. In each of the embodiments according to FIGS. 1 and 2, reducing agent, and in particular a urea-water solution, is fed as the additive. In the embodiment according to FIG. 1, the feed point 3 is disposed upstream of the heater 2 as viewed in the exhaust-gas flow direction 9. In the embodiment according to FIG. 2, the feed point 3 is disposed downstream of the heater 2 as viewed in the exhaust-gas flow direction 9.

Figure 3:
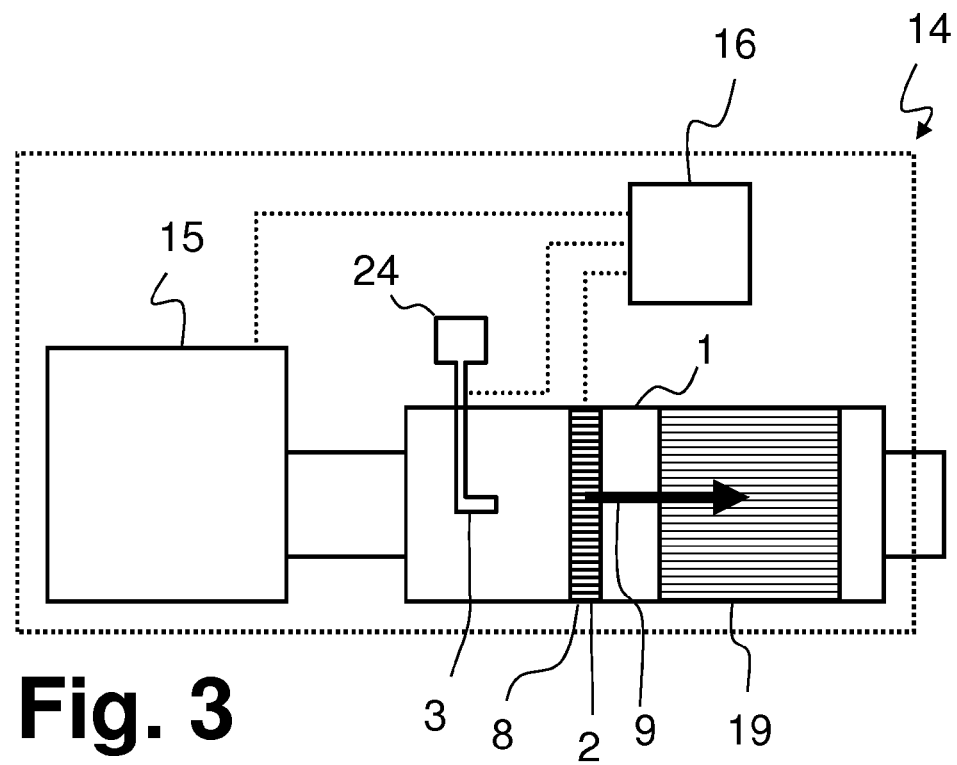
FIG. 3 is a block diagram of a third embodiment of an exhaust-gas treatment device.

In the embodiment according to FIG. 3, an adsorber 19 (in particular an adsorber catalytic converter) is provided in the exhaust-gas treatment device 1 downstream of the feed point 3 (and preferably also downstream of the heater 2) as viewed in the exhaust-gas flow direction 9. Certain pollutant constituents present in the exhaust gas of the internal combustion engine 15 can be temporarily stored in the adsorber. In this embodiment, hydrocarbons are (or, in particular, fuel is) preferably fed as the additive through the feed point 3.

Figure 4:
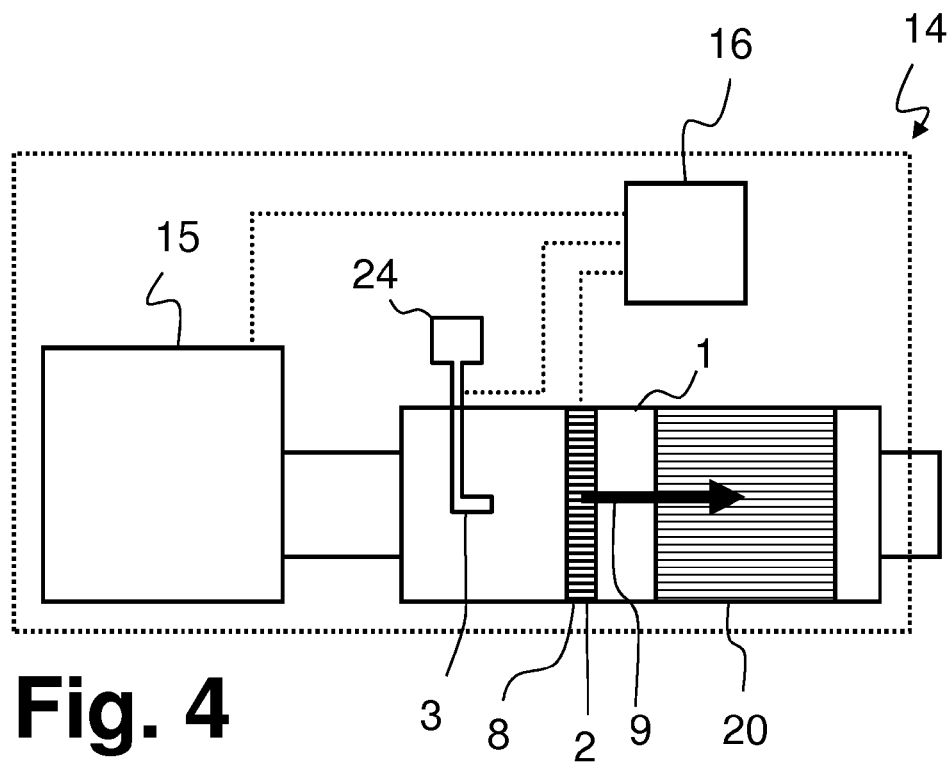
FIG. 4 is a block diagram of a fourth embodiment of an exhaust-gas treatment device.

In the embodiment according to FIG. 4, an oxidation catalytic converter 20 is provided in the exhaust-gas treatment device 1 downstream of the feed point 3 (and preferably also downstream of the heater 2) as viewed in the exhaust-gas flow direction 9. Certain pollutant constituents present in the exhaust gas of the internal combustion engine 15 can be converted in the oxidation catalytic converter. In this embodiment, it is preferable for hydrocarbons (and, in particular, fuel) to be fed as the additive at the feed point 3. The hydrocarbons can be burned in the exhaust-gas treatment device 1 in order to increase the temperature in the oxidation catalytic converter 20 and thus activate certain conversion reactions in the oxidation catalytic converter 20.

Figure 5:
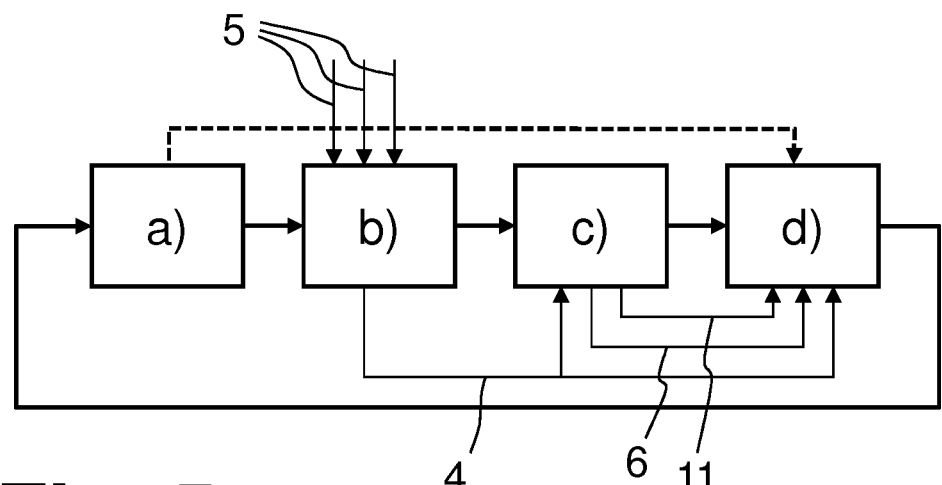
FIG. 5 is a flow diagram illustrating the sequence of the described method.

FIG. 5 shows a flow diagram of an embodiment of the described method. The illustration shows the method steps a), b), c) and d), which are performed in succession. The method steps a), b), c) and d) may be repeated together in the manner of a loop. Metering of additive is initially performed in step a). The metering of additive in step a) is a prerequisite for the initiation of the subsequent method steps b), c) and d). The described method is preferably performed whenever a feed of additive into the exhaust-gas treatment device takes place. Method steps b), c) and d) do not need to be performed every time method step a) is performed. It is, for example, adequate for the method steps to be performed with such regularity that deposits on the heater can be identified in good time and eliminated by using the method. In method step b), an operating state 4 is determined or calculated from various state variables 5 of the exhaust-gas treatment device. The operating state 4 is provided by method step b) for method steps c) and d). In method step c), if the operating state 4 lies in a certain operating state range, a cycle frequency 6 and a heating period 11 (or a heating period length) are determined. The cycle frequency 6 and the heating period 11 are also provided for step d). In method step d), a heater in an exhaust-gas treatment device is operated with the cycle frequency 6 and the heating period 11 if the operating state 4 lies in a certain operating state range.

Figure 6:
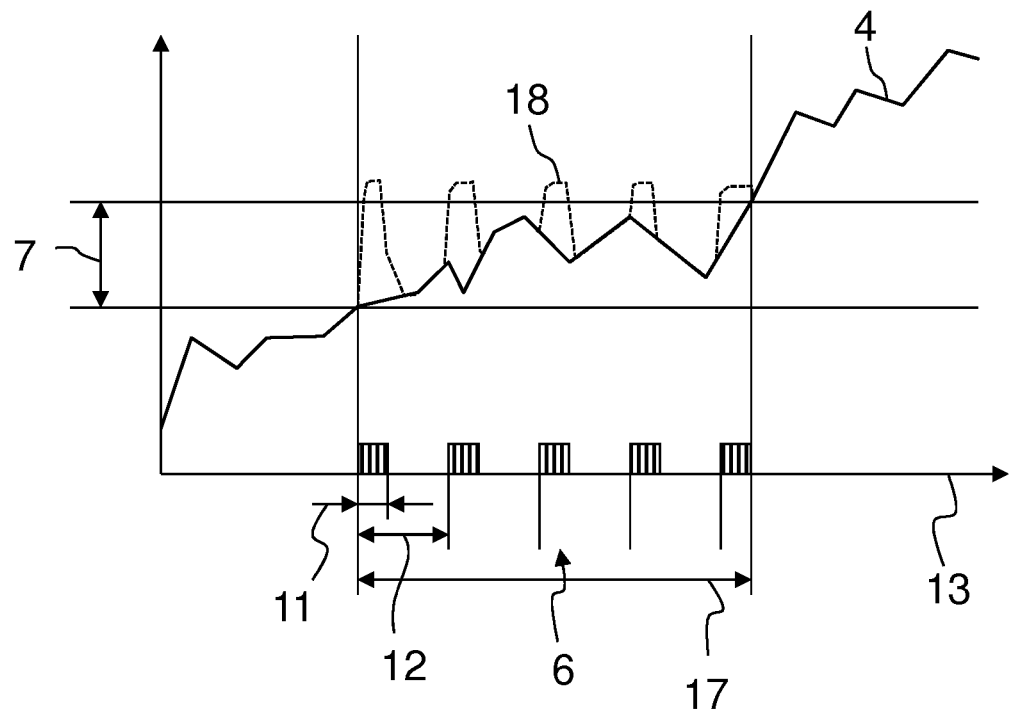
FIG. 6 is a diagram illustrating the operation of an exhaust-gas treatment device.

FIG. 6 shows a diagram illustrating the operation of an exhaust-gas treatment device 1 in accordance with one of the methods described herein. An operating time 13 of an exhaust-gas treatment device 1, or of an internal combustion engine 15 connected to the exhaust-gas treatment device 1, is plotted on the horizontal axis. The operating state 4 of the exhaust-gas treatment device 1 is plotted on the vertical axis. An operating state range 7 is also indicated. The operating state 4 lies in the operating state range 7 over a time interval 17. The exhaust-gas treatment device 1 is therefore operated in accordance with the described method in the time interval 17. In this case, a heater 2 is operated cyclically with a cycle frequency 6 and a resulting cycle length 12, wherein a heating period 11 is provided in each cycle length 12. In order to illustrate the effect of the heater, a heater temperature 18 is also plotted in FIG. 6. The heater temperature 18 registers deflections whenever the heater 2 is activated. The deflections of the heater temperature 18 are selected to be of specifically such an intensity that deposits on the heater 2 are burned off or eroded in an effective manner.

Figure 7:
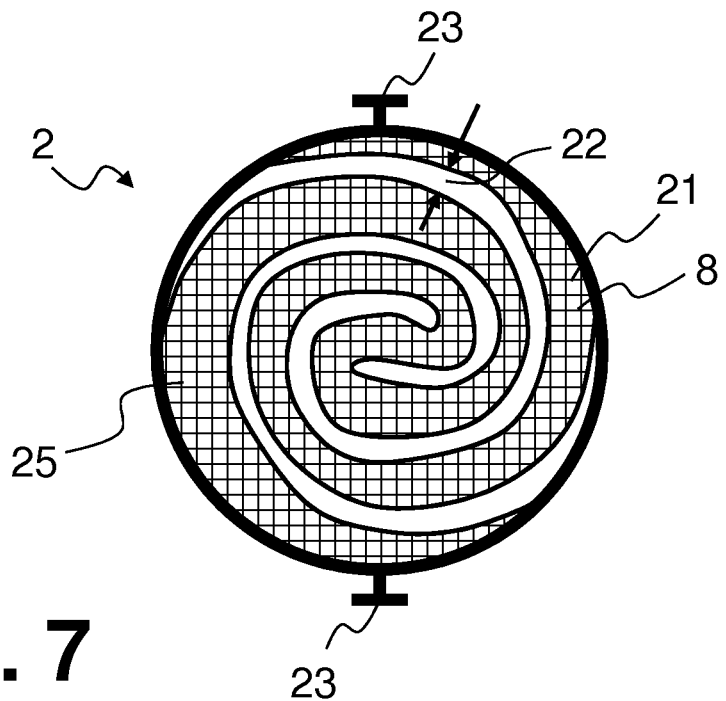
FIG. 7 is a diagrammatic, cross-sectional view of a heatable honeycomb body.

FIG. 7 shows a heater 2 in the form of a heatable honeycomb body forming the catalyst carrier or substrate 8. The honeycomb body 8 has an S-shaped form and has channels 21 through which the exhaust gas can flow. The honeycomb body 8 is produced from a pack, bundle or stack of smooth and corrugated metallic layers (preferably foils) wound in an S-shape. In order to be mechanically stable, a honeycomb body 8 of this type is preferably supported, by way of electrically insulated support pins, on a non-illustrated supporting honeycomb body. Terminals 23 for the introduction of an electrical heating current into the honeycomb body 8 are provided on the honeycomb body 8. The honeycomb body 8 has an insulator 22 formed as a gap or with insulation material. The insulator predefines a current path through the honeycomb body 8 and the terminals 23 are connected to one another through the insulator. The construction of a heatable honeycomb body 8 of the type is described, for example, in European Patent EP 0 541 585 B1, corresponding to U.S. Pat. No. 5,411,711, the entire content of the disclosure of which is incorporated by reference herein. If the channels 21 of the catalyst carrier or substrate 8 become blocked by deposits, less exhaust gas flows through. This results in an increased back pressure of the exhaust-gas treatment device 1, and effective heating of the exhaust-gas stream by the honeycomb body 8 is prevented. The heatable honeycomb body 8 has a surface 25 that is heated when the heatable honeycomb body 8 is operated.

Figure 8:
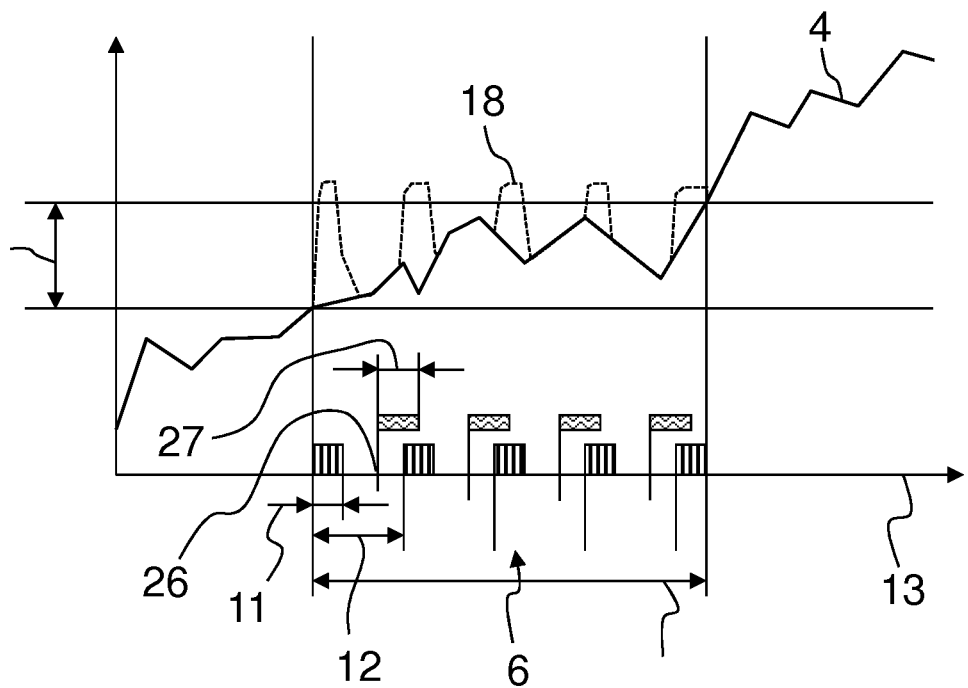
FIG. 8 is a modification of the diagram shown in FIG. 6.

FIG. 8 shows a modification of the diagram of FIG. 6. The reference signs already explained with regard to FIG. 6 are also used again in the diagram in FIG. 8, and therefore do not need to be explained again. The feed of a liquid additive is additionally illustrated in FIG. 8. The feed of liquid additive takes place in each case at an injection time 26, and with an injection duration 27. The injection time 26 and the injection duration 27 may be adapted to the operation of the heater and, in particular, to the cycle frequency 6 of the operation of the heater, to the cycle length 12 and/or to the heating period 11 of the heater.

The described method makes it possible for a heater in an exhaust-gas treatment device 1 to be operated in such a way that deposits on the heater 2 are prevented or removed in an effective manner without the need to use an excessively large amount of heating energy.

The invention claimed is:

1. A method for operating an exhaust-gas treatment device, the method comprising the following steps:
   providing an electric heater for heating at least one exhaust-gas stream or a surface in the exhaust-gas treatment device;
   providing a controller for activating and deactivating the electric heater;

providing a feed point for feeding an additive into the exhaust-gas treatment device causing the additive to impinge on the electric heater;

a) feeding the additive at the feed point;
b) identifying, based on at least one state variable, an operating state of the exhaust-gas treatment device in which deposits can form on the electric heater;
c) setting a cycle frequency as a function of the operating state if the operating state identified in step b) lies in a predefined operating state range; and
d) the controller cyclically activating and deactivating the electric heater at the set cycle frequency if the operating state identified in step b) lies in the predefined operating state range.

2. The method according to claim 1, which further comprises providing the heater with an electrically heatable honeycomb body.

3. The method according to claim 1, which further comprises providing a reducing agent as the additive, and providing at least one SCR catalytic converter in the exhaust-gas treatment device downstream of the feed point in an exhaust-gas flow direction.

4. The method according to claim 1, which further comprises identifying the operating state in step b) by using at least one of the following state variables:
at least one temperature;
a mass flow of the additive through the feed point into the exhaust-gas treatment device; or
a mass flow of an exhaust-gas stream in the exhaust-gas treatment device.

5. The method according to claim 1, which further comprises, in step c), setting a heating period, over which the heater is operated during each cycle length of the cycle frequency, in addition to setting the cycle frequency.

6. The method according to claim 1, which further comprises selecting the cycle frequency to activate the heater for less than 20 percent of an operating time of the exhaust-gas treatment device during which the operating state of the exhaust-gas treatment device lies in the predefined operating state range.

7. The method according to claim 1, which further comprises raising a temperature of an exhaust-gas stream in the exhaust-gas treatment device by less than 50° C. as a result of the cyclic operation of the heater.

8. The method according to claim 1, which further comprises placing the feed point upstream of the heater in an exhaust-gas flow direction through the exhaust-gas treatment device, and metering-in the additive in the exhaust-gas flow direction.

9. The method according to claim 1, which further comprises placing the feed point downstream of the heater in an exhaust-gas flow direction through the exhaust-gas treatment device, and metering-in the additive counter to the exhaust-gas flow direction.

10. A method for operating an exhaust-gas treatment device, the method comprising the following steps:
providing an electric heater for heating at least one exhaust-gas stream or a surface in the exhaust-gas treatment device;
providing a controller for activating and deactivating the electric heater;
providing a feed point for feeding an additive into the exhaust-gas treatment device causing the additive to impinge on the electric heater;
a) feeding the additive at the feed point;
b) identifying, based on at least one state variable, an operating state of the exhaust-gas treatment device in which deposits can form on the electric heater;
c) setting a cycle frequency as a function of the operating state if the operating state identified in step b) lies in a predefined operating state range; and
d) the controller cyclically activating and deactivating the electric heater at the set cycle frequency if the operating state identified in step b) lies in the predefined operating state range;
feeding the additive in step a) at least at one predefined injection time, and adapting the at least one predefined injection time at least to the cycle frequency of the activation of the heater.

11. A motor vehicle, comprising:
an internal combustion engine;
an exhaust-gas treatment device configured to purify a stream of exhaust gases of said internal combustion engine, said exhaust-gas treatment device having a surface, an electric heater configured to heat the exhaust-gas stream or said surface in said exhaust-gas treatment device, and a feed point configured to feed an additive into said exhaust-gas treatment device causing the additive to impinge on said electric heater; and
a controller constructed and configured to operate said exhaust-gas treatment device by carrying out the following steps:
a) feeding the additive at said feed point;
b) identifying, based on at least one state variable, an operating state of said exhaust-gas treatment device in which deposits can form on said electric heater;
c) setting a cycle frequency as a function of the operating state if the operating state identified in step b) lies in a predefined operating state range; and
d) cyclically activating and deactivating said electric heater at the set cycle frequency if the operating state identified in step b) lies in the predefined operating state range.

12. The motor vehicle according to claim 11, wherein said controller activates said electric heater to reach a temperature that effectively burns off or erodes deposits on said electric heater.

13. The method according to claim 1, wherein the controller activates the electric heater to reach a temperature that effectively burns off or erodes deposits on the electric heater.

14. The motor vehicle according to claim 11, which further comprises said controller constructed and configured for feeding the additive in step a) at least at one predefined injection time, and adapting the at least one predefined injection time at least to the cycle frequency of the activation of the heater.

15. The motor vehicle according to claim 11, which further comprises placing the feed point downstream of said heater in an exhaust-gas flow direction through the exhaust-gas treatment device, and said feed point metering-in the additive counter to the exhaust-gas flow direction.

* * * * *